(No Model.)
H. P. HOOD.
HANDLE ATTACHMENT.
No. 275,914. Patented Apr. 17, 1883.
Fig. 2.
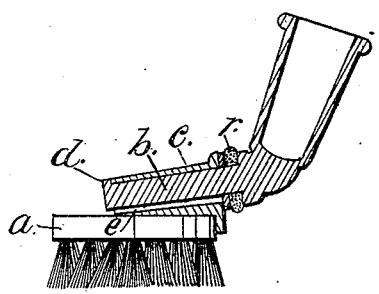
Fig. 3.
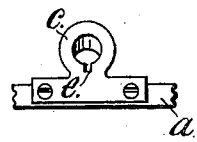
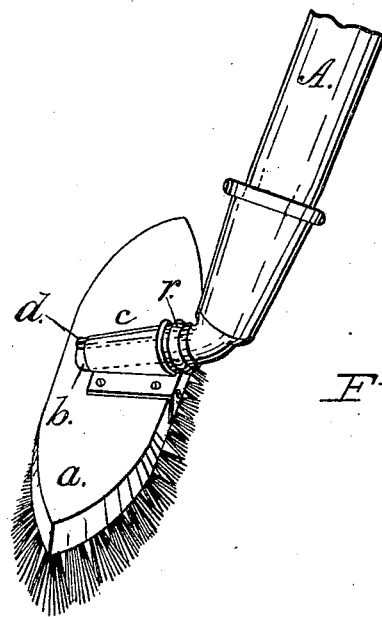
Fig. 1.
WITNESSES:
Wm Thurber
E. E. Sickler
INVENTOR:
Harrison P. Hood.

UNITED STATES PATENT OFFICE.

HARRISON P. HOOD, OF INDIANAPOLIS, INDIANA.

HANDLE ATTACHMENT.

SPECIFICATION forming part of Letters Patent No. 275,914, dated April 17, 1883.

Application filed December 8, 1882. (No model.)

*To all whom it may concern:*

Be it known that I, HARRISON P. HOOD, a resident of the city of Indianapolis, in the county of Marion, State of Indiana, have invented a new and useful Improvement in Handle Attachments, of which the following is a specification, having reference to the accompanying drawings.

My invention relates to an improved means of attaching handles to scrubbing-brushes and other like utensils, my objects being, first, to hold the brush squarely across the line of the handle, or to throw it to the right or left, to form an acute angle therewith, by simply rotating the handle or twisting it in the hand; second, to so construct a handle attachment that the handle can be readily detached from the brush; third, to prevent the brush from moving too freely on the handle.

My invention consists, first, in the combination of a handle terminating in a cylindrical spindle bent to form an angle therewith, a cylindrical socket adapted to receive said spindle and to secure the same across the back of a brush or other like utensil, and means for securing said spindle in said socket, for the purpose of controlling and changing the relative position of the brush by means of the handle, as hereinafter fully described.

My invention consists, further, in the means for detachably securing the spindle in the socket, as hereinafter fully described.

My invention consists, further, in combining a spring-washer with the handle attachment and with the socket in such a manner that the socket is prevented from moving too freely on the spindle, as hereinafter fully described.

The accompanying drawings illustrate my invention.

Like letters refer to the same parts in all figures.

Figure 1 represents a perspective view of a brush and handle attached by my device. Fig. 2 represents a vertical section of the same. Fig. 3 represents an end view of the socket attached to the brush-back.

A is the handle, and $a$ the brush-back.

$b$ is a cylindrical spindle, secured to the end of handle A by means of a tapering socket, into which the handle is driven, or by any other well-known and suitable means, and forming a bent continuation thereof, the axis of the spindle being inclined to the axis of the handle, forming an angle therewith of about sixty degrees.

$c$ is a socket adapted to receive the spindle $b$, and to be fastened by screws to the back of the brush or other like utensil. Spindle $b$ fits loosely in said socket, so that the socket may revolve thereon.

For the purpose of detachably securing the spindle in the socket $c$, I provide the lug $d$, projecting sidewise from the spindle near the outer end, a corresponding groove, $e$, being formed along the bottom of the cylindrical hole in the socket, and the relation of the lug to the handle and to the groove in the socket is such that when the handle is turned downward, or into a position into which it would not be likely to be brought in using, the lug will pass into and along the groove in the socket, and, passing out at the other end, allows the handle to be turned into position for use, and the lug then engaging the end of the socket prevents the withdrawal of the spindle.

For the purpose of preventing the socket $c$ from swinging loosely on spindle $b$, when the brush is raised from the floor in using it, I provide an elastic washer, $r$, which is in this case of rubber, interposed between the shoulder of the spindle $b$ and the end of the socket. Said elastic washer is faced with metal, $w$; or it may be of metal altogether, in the form of a spring. It is of such thickness that the exposed portion of the spindle, between the washer and lug $d$, is a little less than the length of socket $c$, so that when the spindle is inserted in the socket a slight pressure is necessary to cause the lug to clear the other end of the socket.

The operation of my device is as follows: The socket $c$ is screwed to the back of the brush, standing squarely across it. Spindle $b$, attached to handle A, is inserted in the socket in the manner before described, and the handle is turned upward in position for use. The brush may now be used standing squarely across the axial line of the handle, or by simply twisting the handle, causing it to partially revolve. The brush is thrown to the right or left, turning at the same time, so as to form a more or less acute angle with the handle, and thereby adjusting it to use along the sides of a room or to the varying angles of standing wood-work, its position being at all times under the perfect control of the user. It will be observed that the socket, as shown in Fig. 2, does not lie parallel with the face of the brush, the end toward the handle being slightly raised. This is for the purpose of more perfectly keeping the face of the brush in contact with the work when turned to one side, the tendency being to lift the inner edge of the brush as the handle is turned.

I am aware that handle attachments have before been made which were adjustable to varying positions of the brush; but, so far as I am informed, such adjustment was not controllable by rotating the handle about its longitudinal axis.

I claim as my invention—

1. The combination of a handle terminating in a cylindrical spindle bent to form an angle therewith, a cylindrical socket adapted to receive said spindle and to secure the same across the back of a brush or other like utensil, and means for securing said spindle in said socket, substantially as and for the purpose set forth.

2. In a handle-attaching device, the combination, with a handle and a cylindrical spindle forming a bent continuation thereof, and provided with lug $d$, of a socket adapted to receive and revolve on said spindle, and to be attached to a scrubbing-brush or other like utensil, and provided with groove $e$, for the purpose set forth.

3. In a handle-attaching device, the combination, with spindle $b$, lug $d$, and socket $c$, of an elastic washer, $r$, substantially as and for the purpose set forth.

In testimony whereof I have hereunto signed my name this 19th day of June, A. D. 1882.

HARRISON P. HOOD.

Witnesses:
E. E. SICKLER,
FRANK A. JACOB.